April 7, 1970     M. PERLMAN     3,504,418
MEANS FOR AUTOMATICALLY FEEDING AND CONTROLLING A
DEVICE FOR APPLYING TOP STOPS TO SLIDER FASTENERS
Filed June 12, 1967     13 Sheets-Sheet 1

Fig. 1.

INVENTOR
MORRIS PERLMAN
BY
Burgess, Ryan & Hicks
ATTORNEYS

INVENTOR
MORRIS PERLMAN
BY
Burgess, Ryan, & Hicks
ATTORNEYS

INVENTOR
MORRIS PERLMAN

Fig.28.

| | START OF CYCLE (FIG.22) | BOTTOM STOP PULLS 103 AWAY FROM 102 (FIG.23) | 180° ROTATION OF SHAFT 58 (FIG.24) | 270° ROTATION OF SHAFT 58 (FIG.25) | END OF CYCLE (FIG.26) |
|---|---|---|---|---|---|
| GAP DETECTOR BLADE, 103 | CONTACTS 102 | AWAY FROM 102 | ↑ | ↑ | APPROACHING 102 |
| CONTACT FINGER, 102 | CONTACTS 103 | AWAY FROM 103 | ↑ | ↑ | READY TO CONTACT 103 |
| ELECTRIC CLUTCH, 81 | ENERGIZED | DE-ENERGIZED | ENERGIZED | ↑ | DE-ENERGIZED |
| FEED ROLLERS 83, 84 | ROTATE | STOP | START ROTATE | ROTATE | STOP |
| ONE REVOLUTION CLUTCH SOLENOID, 119 | DE-ENERGIZED | ENERGIZED | DE-ENERGIZED | ↑ | ↑ |
| ONE REVOLUTION CLUTCH, 59 | DISENGAGED | ENGAGED | ↑ | ↑ | DISENGAGED |
| MAIN SHAFT, 58 | IDLE | STARTS TO ROTATE | ROTATES | ↑ | STOPS |
| SLIDER DETECTOR SWITCH, 146 | OPEN | CLOSED | ↑ | ↑ | OPEN (BY SLIDER) |
| GAP DETECTOR SOLENOID, 148 | DE-ENERGIZED | ↑ | ENERGIZED | ↑ | DE-ENERGIZED |
| CLUTCH CONTROL SWITCH, 123 | OPEN | CLOSED | ↑ | OPEN | ↑ |
| MAIN SHAFT SWITCH, 126 | 1ST POSITION | ↑ | 2ND POSITION | 1ST POSITION | ↑ |
| RELAY WINDING CIRCUIT, 131 | WINDING CIRCUIT OPEN | ↑ | CLOSED | ↑ | OPEN |
| RAM, 66 | UP | STARTS TO COME DOWN | RAM FULLY DOWN OPERATION COMPLETED | GOING UP | ALL THE WAY UP |
| FIRST RELAY SWITCH, 121 | CLOSED | ↑ | OPEN | ↑ | CLOSED |
| SECOND RELAY SWITCH, 145 | OPEN | ↑ | CLOSED | ↑ | OPEN |
| THIRD RELAY SWITCH, 137 | OPEN | ↑ | CLOSED | ↑ | OPEN |

INVENTOR
MORRIS PERLMAN
BY
Burgess, Ryan & Hicks
ATTORNEYS

United States Patent Office 3,504,418
Patented Apr. 7, 1970

3,504,418
MEANS FOR AUTOMATICALLY FEEDING AND CONTROLLING A DEVICE FOR APPLYING TOP STOPS TO SLIDER FASTENERS
Morris Perlman, 1631 63rd St., Brooklyn, N.Y. 11204
Filed June 12, 1967, Ser. No. 645,249
Int. Cl. B23p 19/04
U.S. Cl. 29—207.5                    13 Claims

ABSTRACT OF THE DISCLOSURE

Apparatus for automatically applying top stops to joined uncut slide fastener stringers. The stringers are pulled past a work station; a stringer gap between the fastener element chains is located by a slider detector; a gap detector blade is positioned within the gap; the motion of the tapes is halted and a pair of top stops applied to a fastener element chain at the work station when the bottom stop of a following fastener element chain strikes the gap detector blade; the gap detector blade is withdrawn from the gap; and the uncut slide fastener stringers are again advanced to begin the next cycle of operation.

BACKGROUND OF THE INVENTION

The invention relates to the art of manufacturing slide fasteners. More particularly, it relates to a device for controlling a top stop machine which forms top stops for said fasteners and applies the top stops at selected locations thereon. The invention moves the incomplete fastener into proper position while said fastener is still integral with a plurality of similar incomplete fasteners, activates the top stop machine, and removes the incomplete fastener with top stops attached.

A complete slide fastener comprises a co-planar pair of flexible tapes, a chain of interlockable fastener elements on each of the opposed edges of the tapes, a bottom stop joining the tapes at one end of the chains of fastener elements, a slider riding on the fastener elements, and a top stop at the upper end of each chain of fastener elements. During the process of manufacturing such slide fasteners an intermediate structure may be created. This structure comprises a very long pair of tapes, with partially intermeshed chains of fastener elements located at regular intervals along their opposed inner edges. Each such pair of partially intermeshed chains is separated from the next by a pair of tape segments free of fastener elements, and each such pair of partially intermeshed chains is permanently joined at their bottom ends by a bottom stop. Further, in the intermediate product a slider is mounted on each pair of chains, so that all that remains to be done to convert the intermediate product to individual slide fasteners is to fasten a top stop to each chain and then cut through the tapes at those segments which are free of fastener elements.

United States Patent No. 3,445,912 discloses a wire-fed dual top stop production and securement machine for slide fasteners. That machine is capable of forming and attaching during each cycle two top stops to the intermediate product described above. However, prior to each cycle of that machine the intermediate product must be properly placed manually, so that a machine attendant is required for each machine at all times.

SUMMARY

The invention is a control device which may be attached to a dual top stop attaching machine for the purpose of automatically feeding through the machine an intermediate product formed during the production of slide fasteners. More particularly, it is a device which will automatically advance the intermediate product during successive attachment cycles and will activate the dual top stop attaching machine at an appropriate moment during each cycle. The invention also incorporates a safety device to halt the machine if it fails to attach two top stops during a cycle of operation. The invention allows a worker to tend several dual top stop machines and to avoid the monotonous task of continually moving the intermediate product through the existing semi-automatic dual top stop machine. It also allows an increase in the speed with which top stops are attached.

Figure 22:
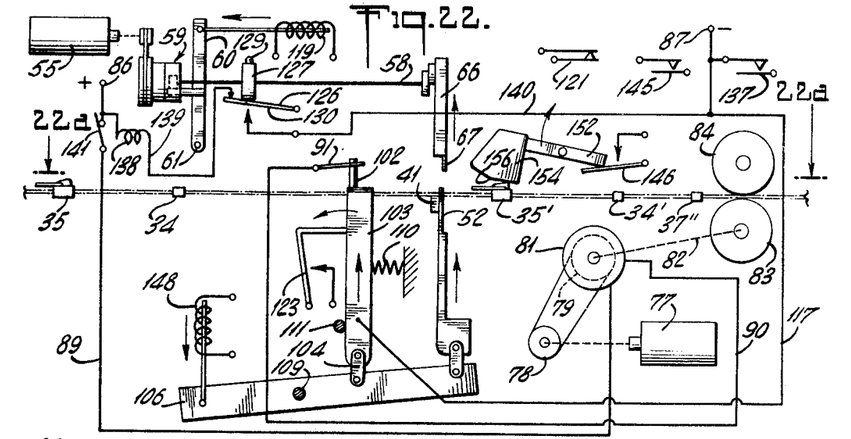
FIGS. 22 through 26 show portions of the circuitry during five successive stages in the operation of the machine, with those circuits which are idle during the stage in question omitted.
Figure 22A:
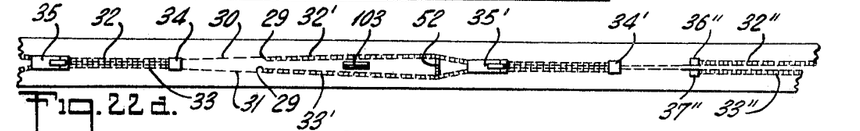
FIG. 22a is a view of a slide fastener stringer taken on plane 22a—22a of FIG. 22.

As may best be seen in FIG. 22a, the partially finished slide fasteners as they enter the machine comprise two continuous tapes 30 and 31. At spaced intervals along the tapes there are located plastic coil separable fastener elements 32 and 33; 32' and 33'; and 32" and 33". These coil segments are fastened together at their leading end by bottom stops 34 and 34'. They are also held together by sliders 35 and 35' located intermediate their ends. The portions of the coil segments between each slider and the corresponding bottom stop are intermeshed, while the remaining portions are disengaged. The trailing end 29 of each separable fastener coil element (as the tapes enter the machine) is unfinished. The unfinished article just described, and shown in FIG. 23a (and the left hand portion of FIG. 22a) will be designated herein as "joined uncut stringers"; the gap between the tapes (extending for example from slider 35' to bottom stop 34 in FIG. 22a) as a "stringer gap"; the structural elements which interlock (whether a single turn of a plastic coil, or a single tooth on a slide fastener employing teeth) as "a fastener element"; and the row of fastener elements on one tape between adjacent stringer gaps as "a fastener element chain."

The present invention is a machine to receive the joined uncut stringers from any suitable storage area and to form and crimp in place top stops 36" and 37" (see FIG. 22a) at the trailing ends 29 of fastener element chains, to prevent them from separating from the tapes and to limit the movement of the slider. Formation of slide fasteners may then be completed by severing the tapes between the adjacent ends of adjacent fastener element chains.

In order to function the machine must advance the joined uncut stringers a distance sufficient to locate the trailing ends 29 at a work station, shear suitable top stop blanks from strips of metal, crimp them in place around the trailing ends, and advance the tapes to bring a succeeding pair of trailing ends to the work station for the next operation.

The two principal portions of the machine are the advance mechanisms adopted to control the position of the joined uncut stringers and the top stop forming and applying mechanism adapted to form and attach the top stops. These two portions are necessarily connected to insure proper sequential operation. The mechanical structure of each will be separately described below, the control circuits and switches which coordinate their operation will next be described, and finally the operation of the machine as it performs a cycle of operation will be set forth.

The top stop forming and applying mechanism

Figure 20:
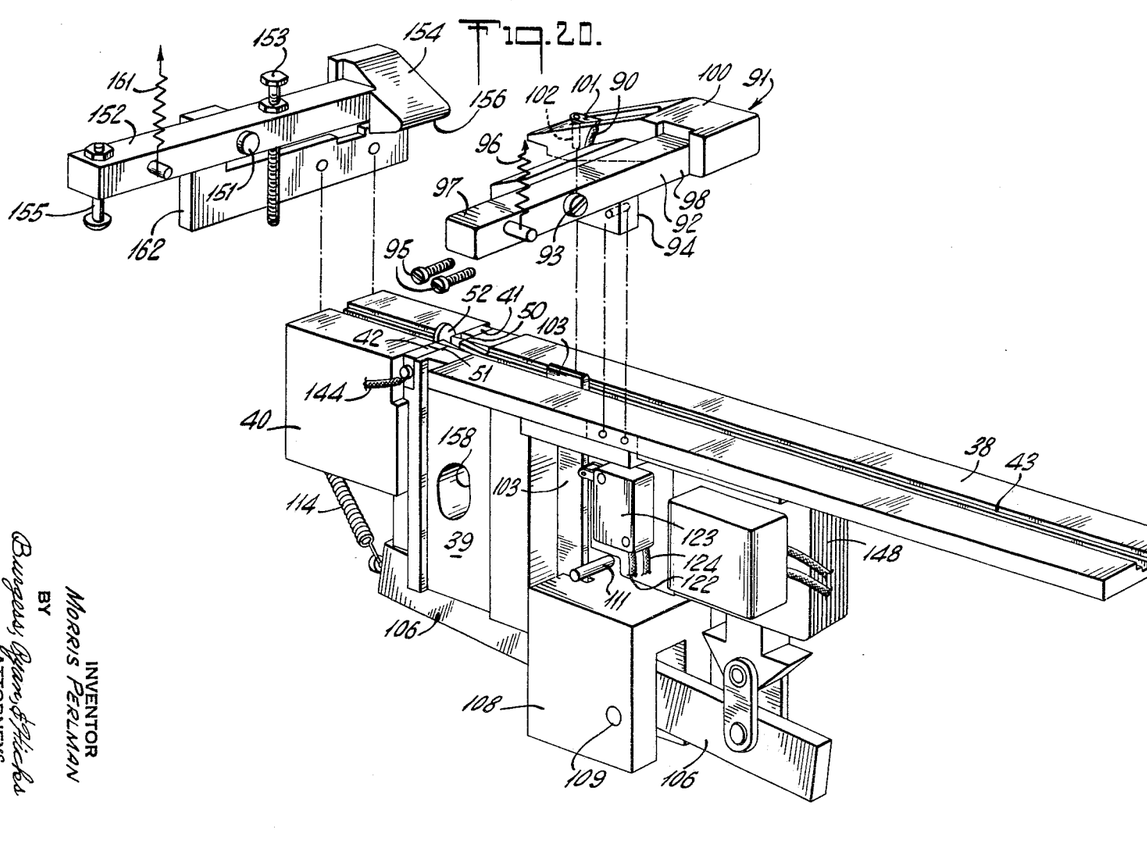
FIG. 20 is an exploded partial perspective view of the separable fastener slideway in the machine, with associated switch mechanism.

The joined uncut stringers being worked upon are drawn in a horizontal position from the rear of the machine toward the front thereof by counter-rotating feed rollers. They are supported during this movement by a plurality of alined machine elements: guide bar 38, die support block 39, front block 40, and lower dies 41 and 42. As may best be seen in FIG. 20 upper surfaces on these machine elements define a horizontal platform on which the tapes 30 and 31 (not shown in FIG. 20, see FIGS. 5 and 8) may rest. In addition, the upper surfaces are cut away to form a central channel 43 in which sliders may travel as the joined uncut stringers are pulled through the machine.

Figures 5, 6, 7, 8, 9:
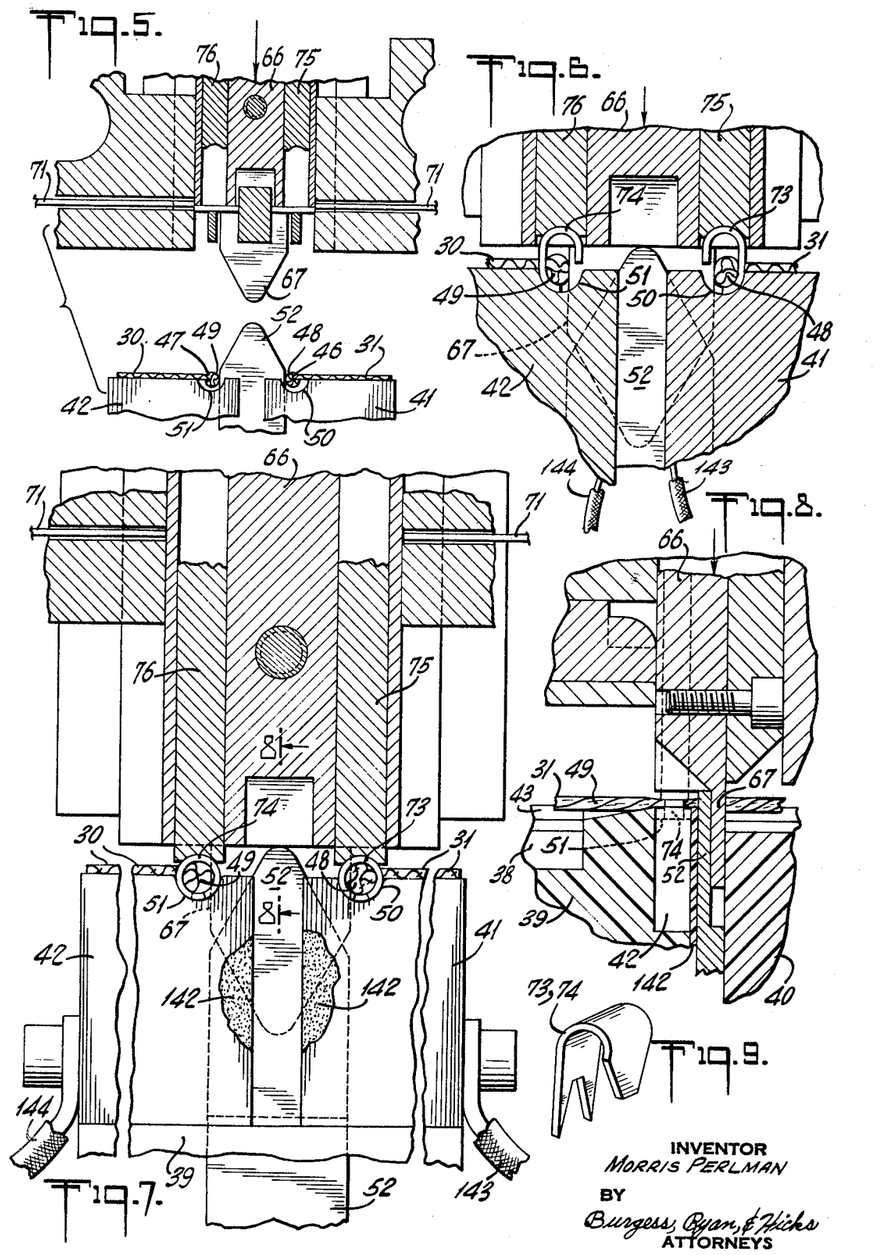
FIG. 5 is an enlarged partial sectional view corresponding to FIG. 4, showing the feeding of metal strips to the dies.
FIG. 6 is an enlarged view corresponding to FIG. 5 showing the formation of top stops as the dies approach a closed position.
FIG. 7 is a view corresponding to FIG. 6, showing a further step in the forming of the top stops as the dies close completely.
FIG. 8 is a sectional view taken on plane 8—8 of FIG. 7.
FIG. 9 is a perspective view of a partially formed top stop.
Figures 23, 23A:
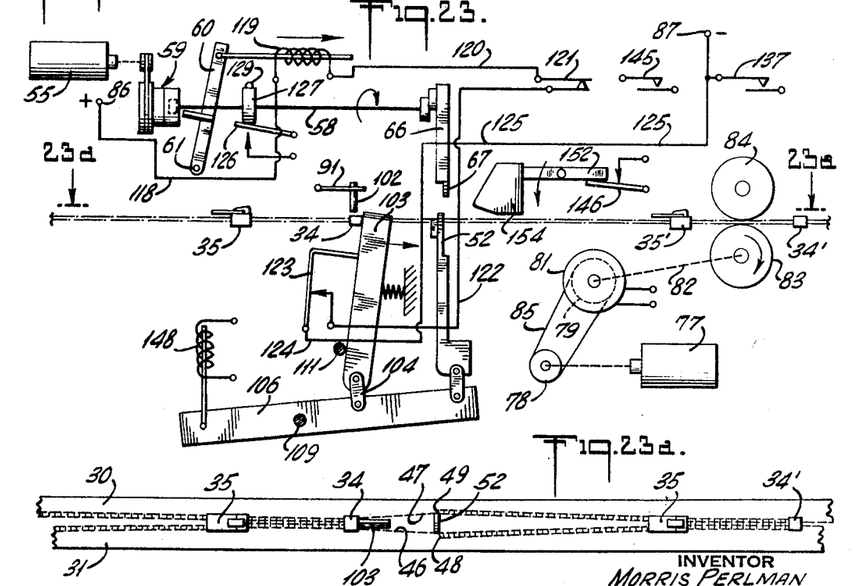
FIG. 23a is a view of a slide fastener stringer taken on plane 23a—23a of FIG. 23.

When the joined uncut stringers have been advanced to the position shown in FIGS. 23 and 23a, the opposed tape edges 46 and 47 are so located that the trailing ends 29, 29 of the coils of a slide fastener overlie the lower die blocks 41 and 42, as shown in FIG. 5. Lower die block 41 is provided with a horizontal groove 50 of semi-circular cross-section, and a similar groove 51 is formed in lower die block 42. These grooves define lower clincher dies. Proper lateral positioning of the tape edges 46 and 47 in the lower clincher dies is insured by lower spreader tongue 52.

Figure 1:
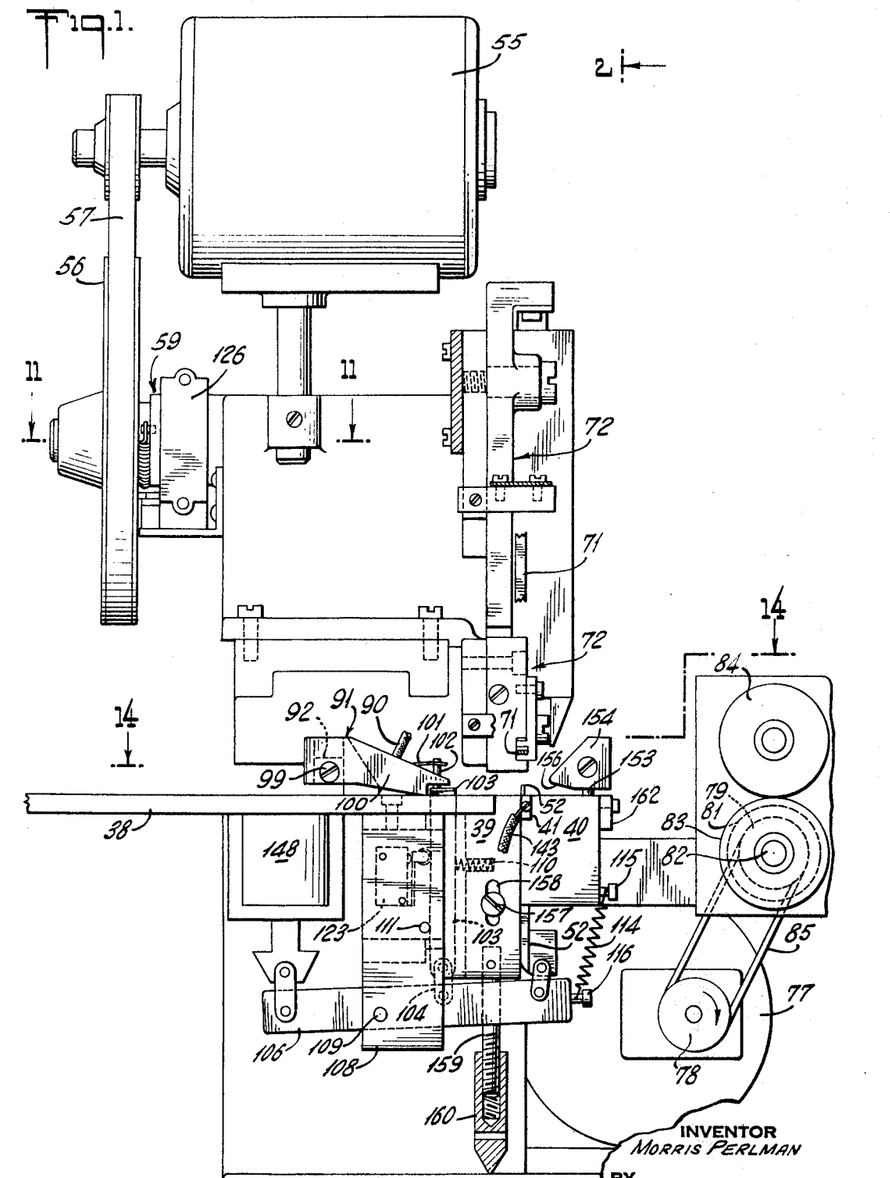
FIG. 1 is a side view of a machine embodying the invention.
Figure 2:
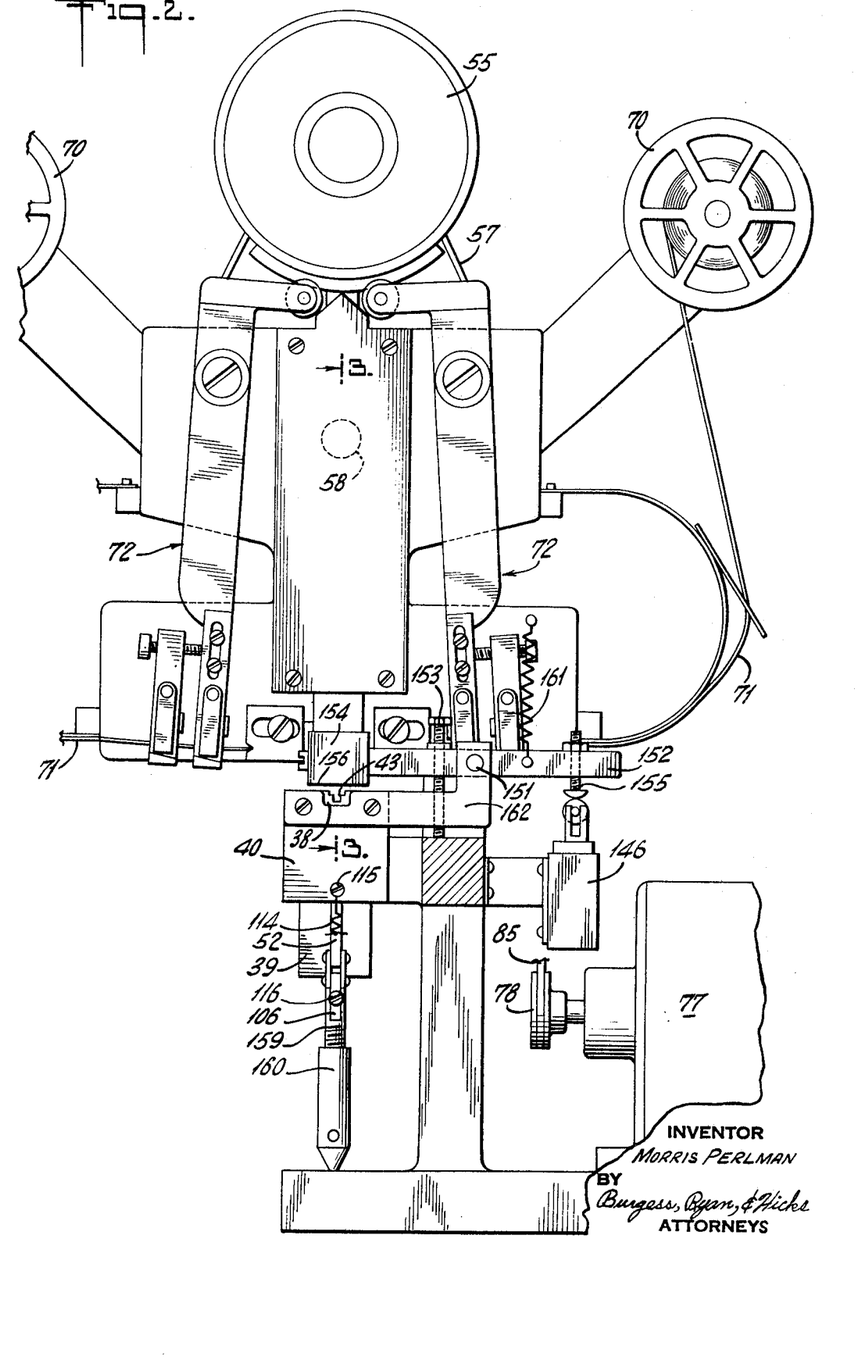
FIG. 2 is a sectional view taken on plane 2—2 of FIG. 1.

As may best be seen in FIGS. 1 and 2, the forming portion of the machine comprises various vertically reciprocable sliding elements which form top stops and attach them to the top ends of the separable fastener coil, together with reels for holding the strip material from which such top stops are formed and reciprocable feed clutches for feeding the strip material beneath the sliding elements.

Power for the forming operation is provided by a constantly running electric motor 55 which drives a pulley 56 through a belt 57. This pulley rotates constantly and may be connected to a mainshaft 58 when desired by means of a one-revolution clutch 59. Such one-revolution clutches are well known and need not be described in detail. The one-revolution clutch is controlled by release lever (see FIG. 11) which pivots about bolt 61. When the release lever is in the rearward position shown in FIG. 11 the one-revolution clutch is disengaged. When the release lever is swung away from the pulley 56 the clutch engages and remains engaged until the release lever is restored to the position of FIG. 11 and a full revolution of the clutch has been completed. Thus momentary displacement of the release lever from the rearward position will result in a single revolution of mainshaft 58.

Figures 3, 4:
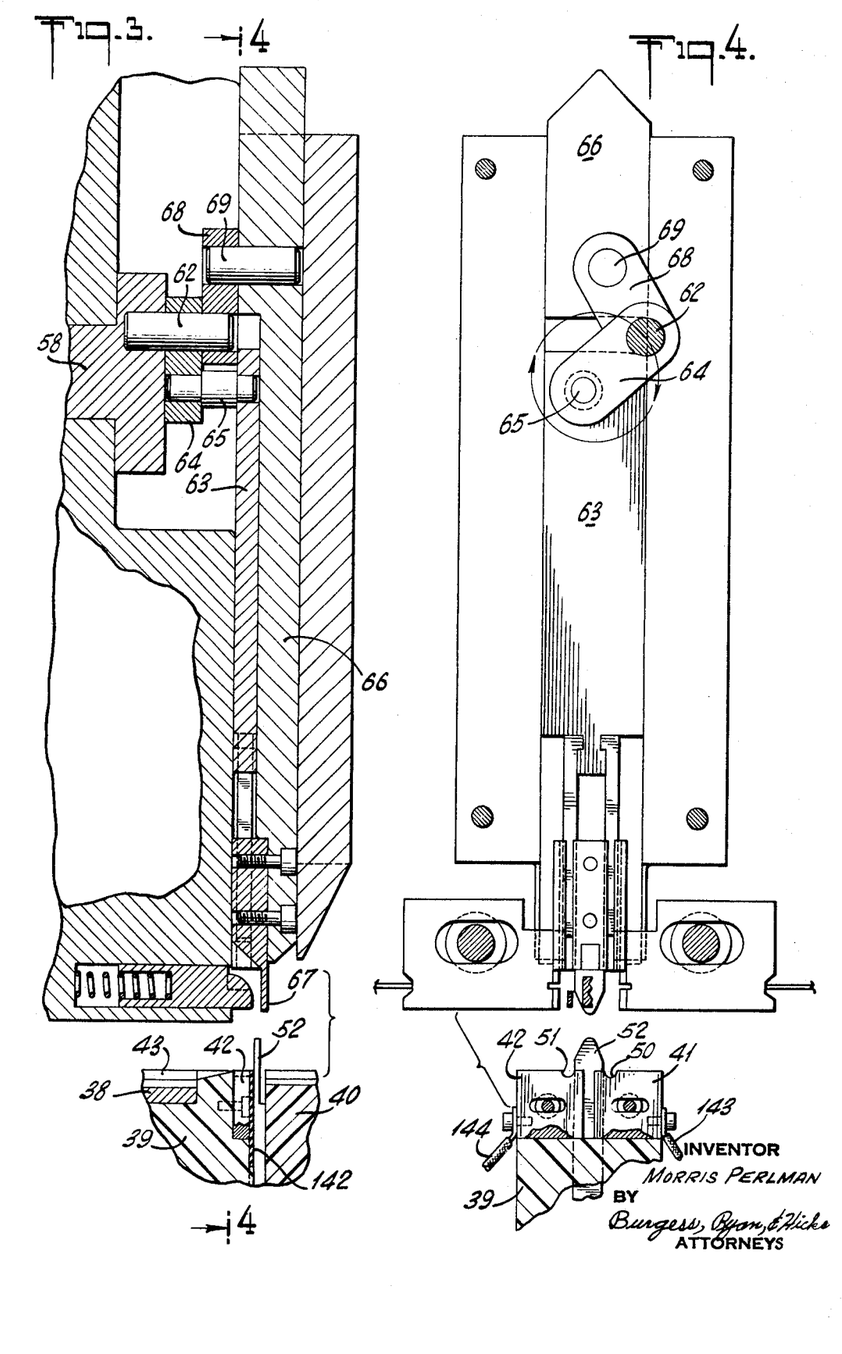
FIG. 3 is an enlarged partial sectional view on plane 3—3 of FIG. 2.
FIG. 4 is an enlarged partial sectional view on plane 4—4 of FIG. 3.

Rotation of mainshaft 58 causes the eccentrically mounted pivot pin 62 to sweep through a circle as indicated by the arrows in FIG. 4. Motion is transmitted from the pivot pin to drive plate 63 through a driver link 64 and an arbor 65. Similarly, motion is also transmitted to a ram 66 through a second driver link 68 and a pin 69. Ram 66 carries at its lower end an upper tongue 67, which serves to maintain the tape edges in proper alinement during the operation of placing the top stops (see FIGS. 6 and 7).

As shown in FIG. 2, the machine is equipped with reels 70, 70 for the strips of metal 71, 71 from which the top stops are formed. Advancing mechanisms 72, 72 feed the strips toward the forming station during each cycle. The structure of the advancing mechanisms and of the top stop forming and applying mechanism will not be described in detail herein, since it is so described in United States Patent No. 3,445,912. It is sufficient to state that, at each cycle, metal top stops 73, 73 are formed and then crimped or curled tightly around the ends of the plastic coil segments located at the edges of the tapes 30, 31 by metal drivers 75, 76 and the lower dies 41 and 42. FIG. 5 shows top stop blanks being sheared from the metal strips. FIG. 6 shows the top stops partially crimped about the top ends 48 and 49 of the coils. FIG. 7 shows the completion of the top stop attaching operation, the lower dies 41 and 42 and the metal drivers having shaped them.

The advance mechanism

The advance of the joined uncut stringers is achieved by means of motor-driven feed rollers. An electric feed motor 17 runs constantly. By means of rubber belt 85, pulley 78 on the motor shaft drives a pulley 79 on the input shaft 80 of the electric clutch 81. While suitably energized by an electric current the electric clutch transmits the rotary motion of the input shaft 80 to an output shaft 82, on which is mounted lower feed roller 83. An upper feed roller 84 rotates in a direction opposite to that of the lower feed roller and they advance the joined uncut stringers which feed into the bight between them. They may be resiliently held together by springs or one or both may be made of rubber in order to avoid crushing the separable fasteners.

The control circuits and switches

Figure 21:
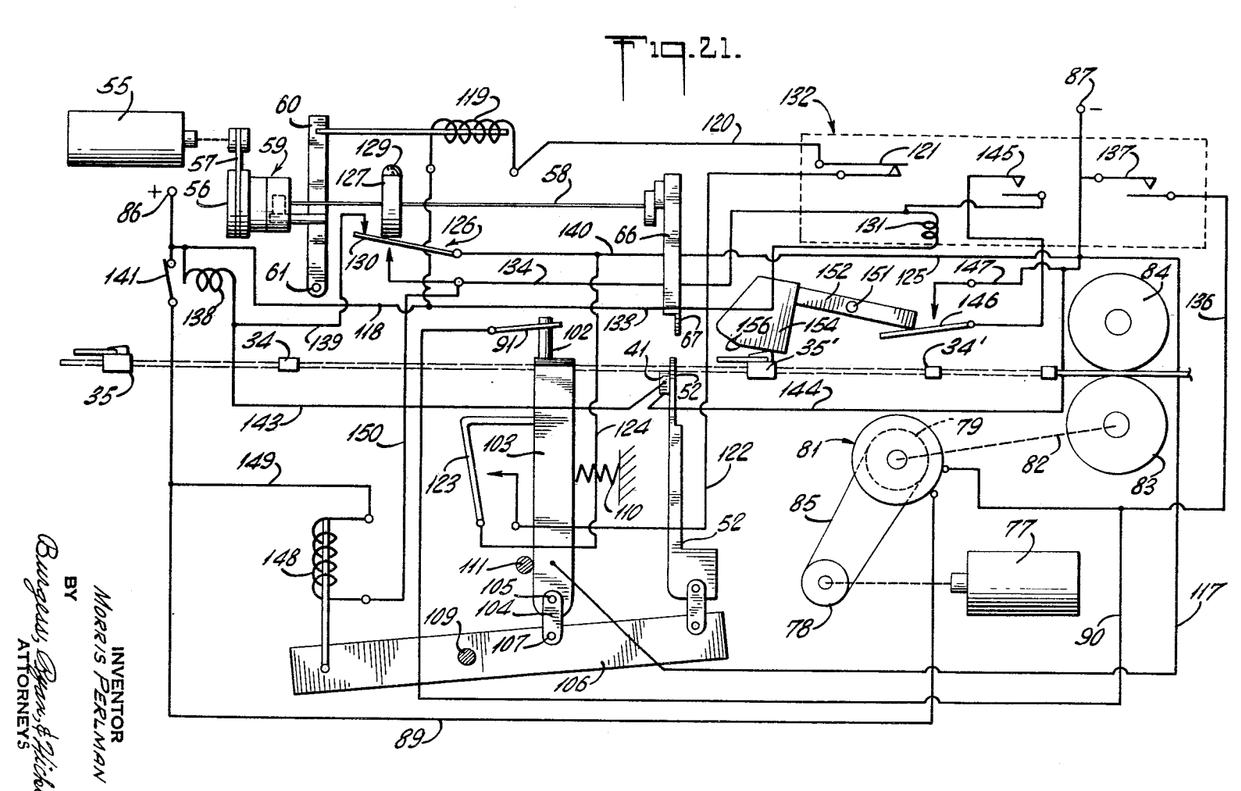
FIG. 21 is a schematic showing of the electrical circuitry employed in the invention.

The control circuits will first be described separately and in the conditions in which they are found at various times during the operating cycle of the machine. Then a description will be given showing the operation of the circuits in sequence. FIG. 21 shows all the control circuits in schematic form. FIGS. 22–26 show active portions of the control circuits during different phases of the machine's operation, inactive circuits being omitted for clarity.

Figure 14:
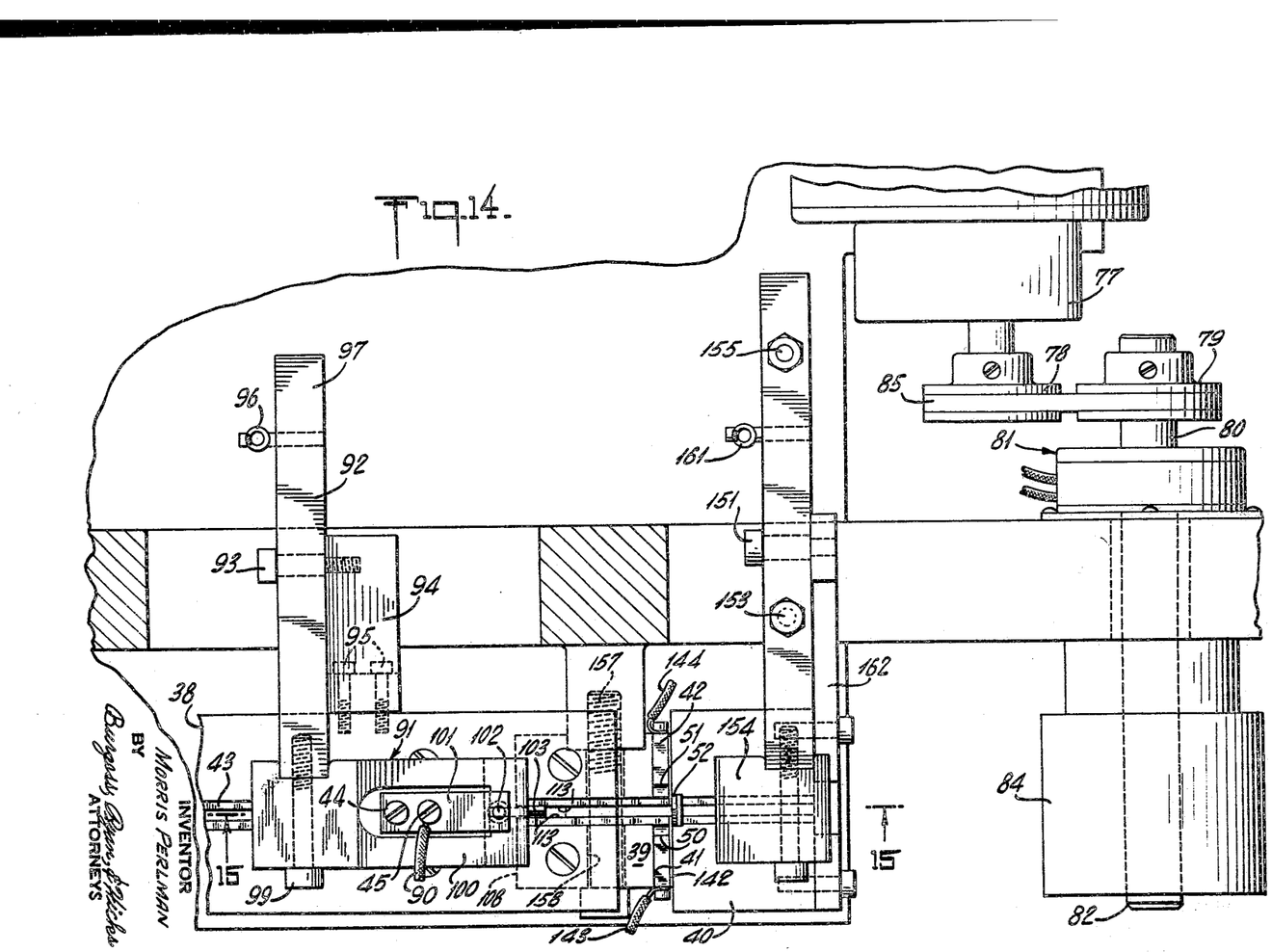
FIG. 14 is an enlarged partial sectional view taken on plane 14—14 of FIG 1.

FIG. 22 shows the condition of the control circuits and switches during the portion of the cycle when the joined uncut stringers are being advanced. Terminals 86 and 87 are connected across a suitable electric power source. An electric clutch current flows through a first feed control circuit from terminal 86 through closed safety switch 141 and wire 89 to electric clutch 81. From the electric clutch this current flows by way of wire 90 to gap detector switch 91 (see FIGS. 14, 15 and 20). The gap detector switch comprises a gap detector arm 92 which is pivoted for limited rotation in a vertical plane about bolt 93. Bolt 93 screws into a fixed extension member 94, which is in turn bolted to the guide bar 38 by bolts 95, 95. A tension spring 96 exerts an upward force on the outer end 97 of the gap detector arm, tending to bias its inner end 98 in a downward direction. Held to the inner end 98 by bolt 99 is a gap detector shoe 100 constructed of plastic-impregnated fiber or other electrical insulating material. The gap detector shoe rides on the upper surface of the advancing joined uncut stringers and helps to keep the opposed inner edges of the tapes centered above the central channel 43 by confining the plastic coils on said edges to the channel. A conducting metal leaf spring 101 is mounted with a recess in the upper surface of the shoe by bolts 44 and 45, the latter also serving as a terminal for wire 90. From the free end of the leaf spring a metal contact finger 102 depends, so positioned as to make electrical contact with a gap detector blade 103.

As may best be seen in FIG. 15, the gap detector blade 103 is supported from below by links 104, 104 to which its bottom end is attached by pivot 105. These links are in turn pivotally attached to swing arm 106 by pivot 107. Swing arm 106 is pivotally attached to the frame 108 of the machine by pin 109. The gap detector blade is further positioned by compression spring 110 which forces it against horizontal limit pin 111 and the end face 112 of a slot in guide bar 38. The side faces 113 of this slot maintain the gap detector blade in alinement with the central channel 43. A tension spring 114 is fastened at one end to a bolt 115 screwed into front block 40 and at the other to outer end 116 of the swing arm, tending to lift the latter and thus to hold the gap detector blade in the raised position shown in FIG. 15.

Figure 15:
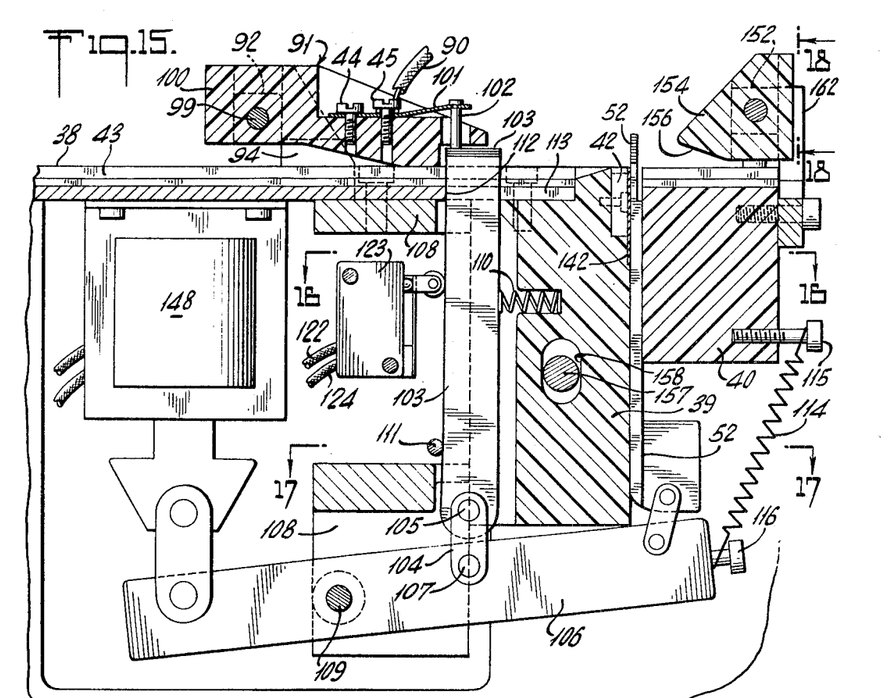
FIG. 15 is a partial sectional view taken on plane 15—15 of FIG. 14.
Figures 16, 17, 18, 19:
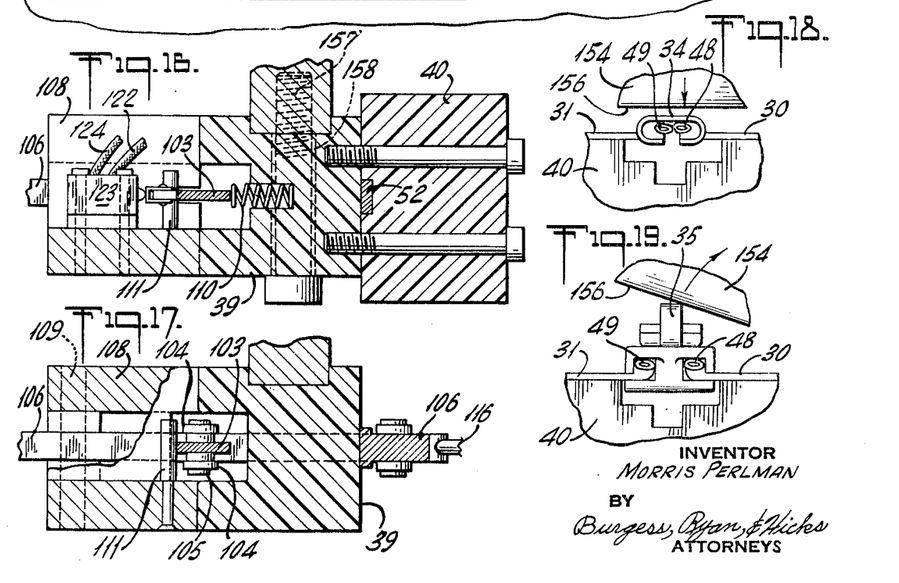
FIG. 16 is a partial sectional view taken on plane 16—16 of FIG. 15.
FIG. 17 is a partial sectional view taken on plane 17—17 of FIG. 15.
FIG. 18 is a partial view of a switch mechanism in a closed position.
FIG. 19 is a view corresponding to that of FIG. 18, but with the switch mechanism in an open position.

With the gap detector blade in contact with the contact finger 102, as shown in FIGS. 15 and 22, the first feed control circuit is closed since current can flow from wire 90 through the gap detector switch 91 to the gap detector blade 103 through wire 117 to negative terminal 87. Thus, as long as the gap detector blade touches contact finger 102, the feed rollers continue to pull the joined uncut stringers through the machine. During this operation the upper end of the gap detector blade extends upward through the gap between the tapes 30 and 31, as shown in FIGS. 22 and 22a. When a bottom stop 34 (see FIG. 23a) contacts the gap detector blade 103 it pulls the upper end of the latter toward the front of the machine, away from contact finger 102. This motion breaks the first feed control circuit at the gap detector switch 91 and stops the feed rollers 83 and 84, bringing the joined uncut stringers to a halt. By proper placement of the gap detector blade relative to the lower dies 41 and 42, it can be arranged that the trailing ends 29 of a pair of fastener chains will come to rest in the lower dies when the feed rollers stop.

FIG. 23 shows in schematic form a signal circuit which moves release lever 60 and thus activates the one-revolution clutch 59. As shown, signal current passes from terminal 86 through wire 118 to clutch solenoid 119. From the clutch solenoid it passes by wire 120 through first relay switch 121 and wire 122 to clutch control switch 123. From there it flows through wires 124 and 125 to terminal 87. The clutch control switch is held open when the gap detector blade 103 is in the vertical position of FIG. 22 and closes when the blade moves to the tilted position of FIG. 23.

Figures 10, 11, 12, 13:
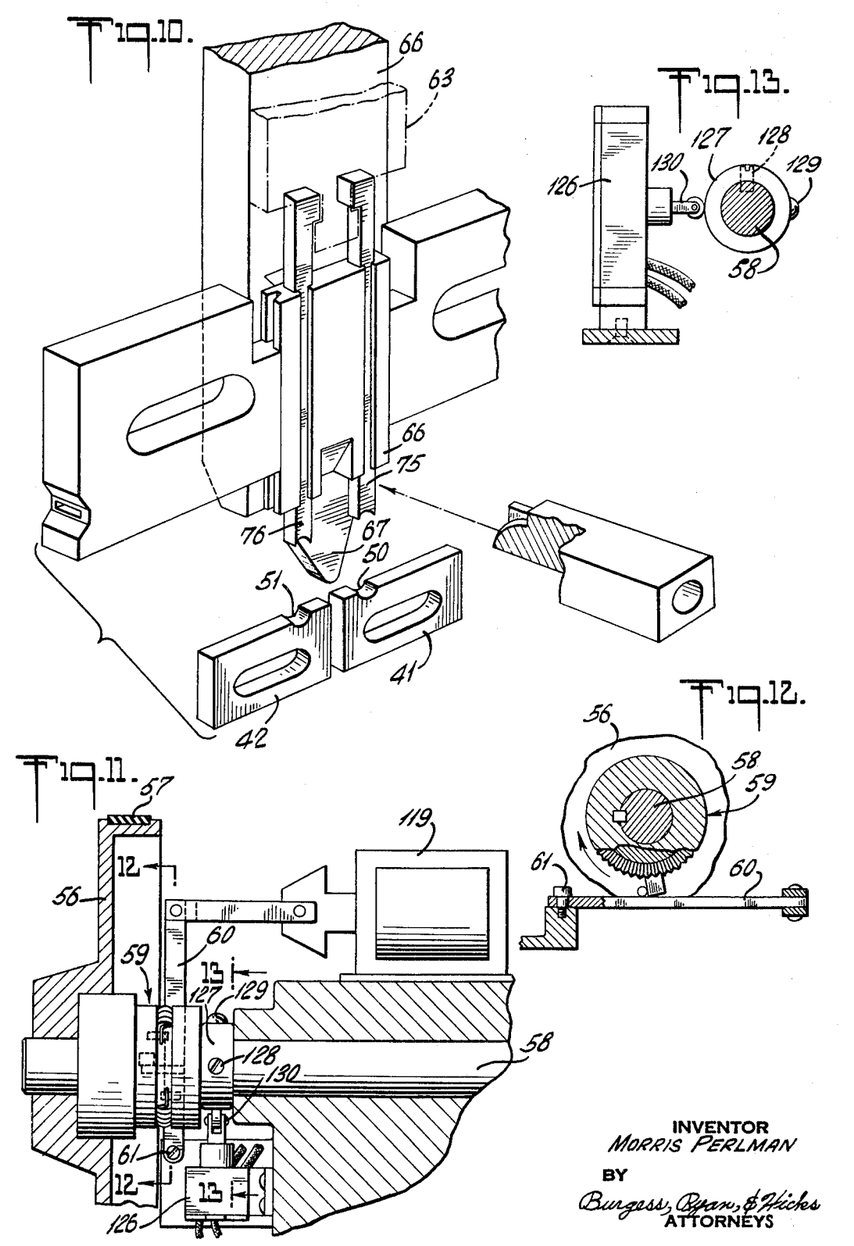
FIG. 10 is a partial perspective view of dies and associated mechanism for forming and attaching top stops.
FIG. 11 is an enlarged partial sectional view taken on plane 11—11 of FIG. 1.
FIG. 12 is a partial sectional view taken on plane 12—12 of FIG. 11.
FIG. 13 is a partial sectional view taken on plane 13—13 of FIG. 11.
Figure 24:
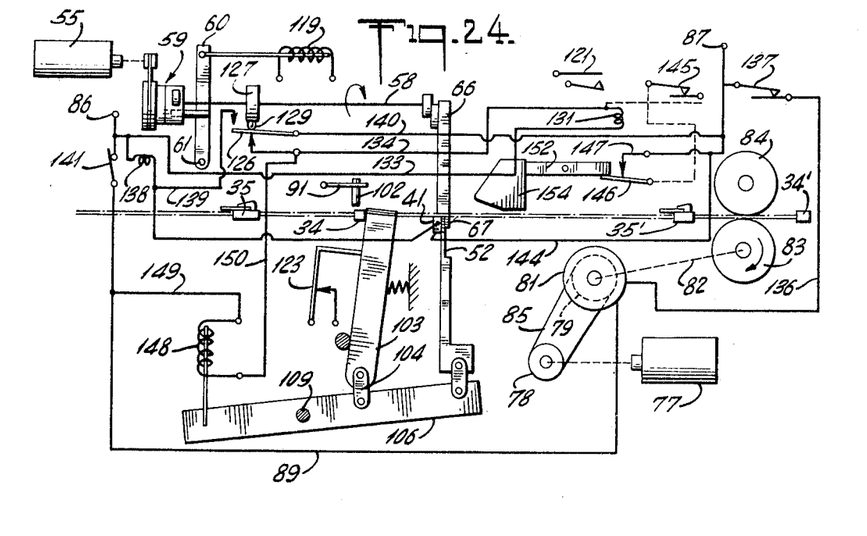

FIG. 24 illustrates several energized control circuit. As shown in that figure the drivers 75 and 76 (see FIG. 7) are in their lowermost position, after having crimped two top stops around the coil ends. This represents the situation when the mainshaft has completed approximately half a revolution from the position shown in FIG. 22. When this position is reached, a mainshaft switch 126 is moved from a first position as shown in FIGS. 11, 13 and 23 to a second position as shown in FIG. 24. This occurs because collar 127 (which is attached by a set-screw 128 to the mainshaft) rotates one-half revolution, causing lobe 129 to momentarily depress mainshaft switch finger 130. With the mainshaft switch 126 in the second position, a relay current can flow through an attachment machine switch second circuit from terminal 86 to terminal 87 through the winding 131 of relay 132 (indicated by dashed lines in FIG. 21). This relay current passes through wire 133 to the winding, from the winding to mainshaft switch 126 through wire 134, and from the mainshaft switch to terminal 87 via wire 135. Normally, springs hold first relay switch 121 in a closed position, and second and third relay switches 145 and 137 in an open position. When current flows through winding 131, however, first relay switch 121 opens, and second and third relay switches 145 and 137 close.

With the switches in the positions shown in FIG. 24, an electric clutch current can also flow to the electric clutch 81, causing it to engage. The electric clutch current passes through a second feed control circuit from terminal 86 to the electric clutch by way of wire 89, from the electric clutch via wire 136 to the third relay switch 137 and through that switch to terminal 87.

Movement of the mainshaft switch 126 to the second position energizes the gap detector blade solenoid 148. A gap detector solenoid current flows for this purpose through wires 149, 150, the mainshaft switch, and wire 140. As shown in FIG. 24 this current has just begun to flow, and the swing arm 106 has not yet had time to move.

FIGS. 21, 22, and 24 also illustrate circuits which constitute a safety feature designed to stop the machine if there is a failure to attach either or both of the top stops during the cycle. This might occur, for example, if there was a failure to feed metal strips to the forming portion of the machine. The mainshaft switch 126 is normally biased by a spring into the first position shown in FIG. 21. In this position the mainshaft switch completes a first safety switch circuit between the terminals 86 and 87 through safety relay winding 138 by way of wires 139 and 140. The current through this circuit holds safety switch 141 in the closed position against the force of a spring. When the lobe 129 on collar 127 moves the mainshaft switch to the second position (FIG. 24) the first safety switch circuit just described is broken. Safety switch current flow through the safety relay winding 138 is then maintained (and the safety switch thus kept closed) by a second safety switch circuit through the top stops, dies, and drivers in the forming mechanism, as described in the following paragraph.

The lower dies 41 and 42 are bolted to front block 40, which is of an electrically insulating material. They do not touch each other, and they are electrically insulated from the lower spreader tongue 52 by a sheet of insulating material 142. When the drivers 75 and 76 (see FIG. 7) have successfully applied top stops 73 and 74, however, and are in their lowermost position, a second safety switch circuit is completed between the lower dies. The safety switch current flows from one lower die through a top stop to a driver, through the ram 66 to the other driver, and through the other top stop to the other lower die. If either top stop is missing this circuit is not completed. One lower die is connected to the safety relay winding 138 by wire 143 and the other to terminal 87 by wire 144. Thus, during the period when the mainshaft switch is in the second position if a top stop is missing safety switch 141 will open the circuit to the electric clutch, stopping the feed rollers. Switch 141, unless manually reset, remains open even if current through the safety relay winding resumes its flow.

Figure 25:
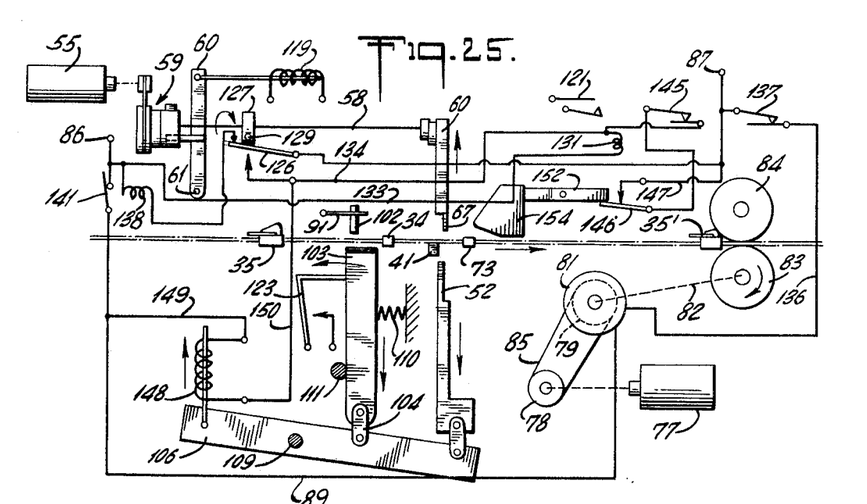

In FIG. 25 there are shown the electric circuits which are energized after a pair of top stops have been attached and while the joined uncut stringers are being advanced. The electric clutch 81 is supplied with an electric switch current through a second feed control circuit comprised of wires 89 and 136 and third relay switch 137, so that the feed rollers continue to rotate. The winding 131 of relay 132 remains energized, the relay current flowing, however, through a second relay circuit, from terminal 86 to the winding by wire 133, from the winding through a second relay switch 145 to a slider detector switch 146. From the slider detector switch the current passes to terminal 87 by way of wire 147.

With the circuits in the condition shown in FIG. 25, the mainshaft switch 126 is again in the first position (the lobe 129 having passed beyond mainshaft switch finger 130). Current from the gap detector solenoid 148 can no longer pass through the mainshaft switch, but finds an alternate route to terminal 87 by way of a gap detector solenoid circuit comprised of wires 150 and 134, second relay switch 145, slider detector switch 146 and wire 147. Relay current in the winding 131 of relay 132 continues to flow through a second relay circuit from terminal 86 by way of wire 133, through the second relay switch 145, through slider detector switch 146, and to terminal 86 by way of wire 147.

The condition described immediately above is altered, however, when the slider of the next separable fastener opens slider detector switch 146. The mechanism which provides this alteration is shown in FIGS. 2, 14, 15, 20 and 21. It comprises an L-shaped support bar 162 bolted to front block 30. One end of the support bar bears a horizontal pivot 151 on which slider detector arm 152 is mounted for limited rotation. A tension spring 161 tends to rotate slider detector arm 152 in a counterclockwise direction as seen in FIG. 2. An adjustable stop screw 153 limits such counterclockwise rotation. A slider detector head 154 at the end of the slider detector arm is placed to allow free passage of top and bottom stops and of fastener elements below it, but to be raised during the passage of a slider below it. When the slider detector head is raised slider detector switch 146 is opened, an adjustment screw 155 being provided to permit adjustment for different slider sizes and to allow precise timing of the opening point of the switch. The slider detector head 154 is provided with a contact face 156 which slopes downward in the direction of tape travel. This slope, together with adjustment screw 155, allows some variation in the position of the slider which will activate switch 146. The relay winding 131 is deenergized when slider detector switch 146 is opened, allowing the second relay switch 145 and the third relay swith 137 to open, and the first relay switch 121 to close.

Figure 26:
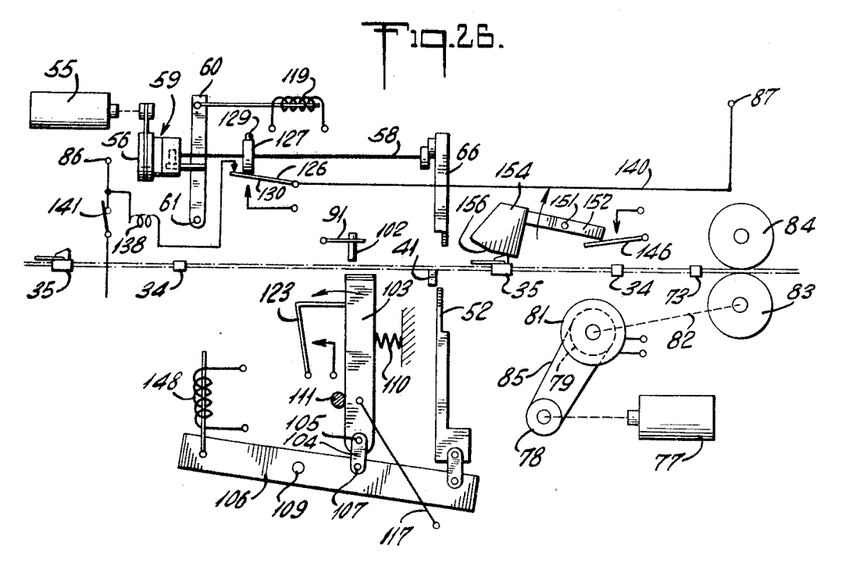

FIG. 26 shows the situation where the relay winding 131 is deenergized and all circuits are open. As shown, the gap detector blade 103 is still in its lowered position, not having had time to rotate about pivot 109.

The operating cycle

In FIG. 26 the moment is illustrated when a slider 35 has raised the slider detector head 154 and all circuits (except the first safety switch circuit) have opened. Since the gap detector solenoid 148 is thereby deenergized, the gap detector blade 103 next rises under the influence of tension spring 114. Simultaneously, the lower spreader tongue 52 which is linked to the outer end of swing arm 106 also rises. The upper ends of both these elements enter a stringer gap. Once the gap detector blade touches contact finger 102 the first feed control circuit is closed, as depicted in FIG. 22. After being momentarily deenergized by the opening of switch 146, the electric clutch 81 again receives an electric clutch current and engages, so that the joined uncut stringers begin to advance as the feed rollers 83 and 84 revolve.

The advance continues until the bottom stop of the next fastener element chain pulls the gap detector blade 103 away from the contact finger 102, leading to the situation of FIG. 23. Motion of the joined uncut stringers ceases as the electric clutch current is cut off. However, the clutch solenoid 119 receives a signal current through a signal circuit through clutch control switch 123, and operates release lever 60, allowing one-revolution clutch 59 to engage. This causes mainshaft 58 to begin a revolution. When drivers 75 and 76 are at or near their bottom position, the first safety switch circuit is opened as shown in FIG. 24. The switch positions shown there initiate an automatic electric check; if there is no current flow through the second safety switch circuit, which includes the two stops, current in safety relay winding 138 will cease and safety switch 141 will open, stopping the machine. If switch 141 remains closed, however, operation of the gap detector solenoid 148 will initiate the withdrawal downward of the gap detector blade 103 and the lower spreader tongue 52. This withdrawal allows the feed rollers to begin advancing the tapes as the electric clutch engages, giving rise to the situation depicted in FIG. 25.

When the advance of the tapes has caused the slider of a new fastener to open switch 146, the cycle described above begins again.

Figure 27:
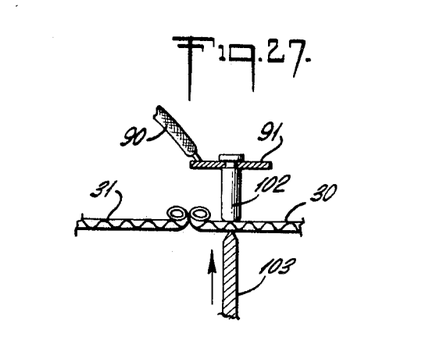
FIG. 27 shows a safety switch arrangement for sensing misalignment of a slide fastener tape in the machine.
Figure 28:
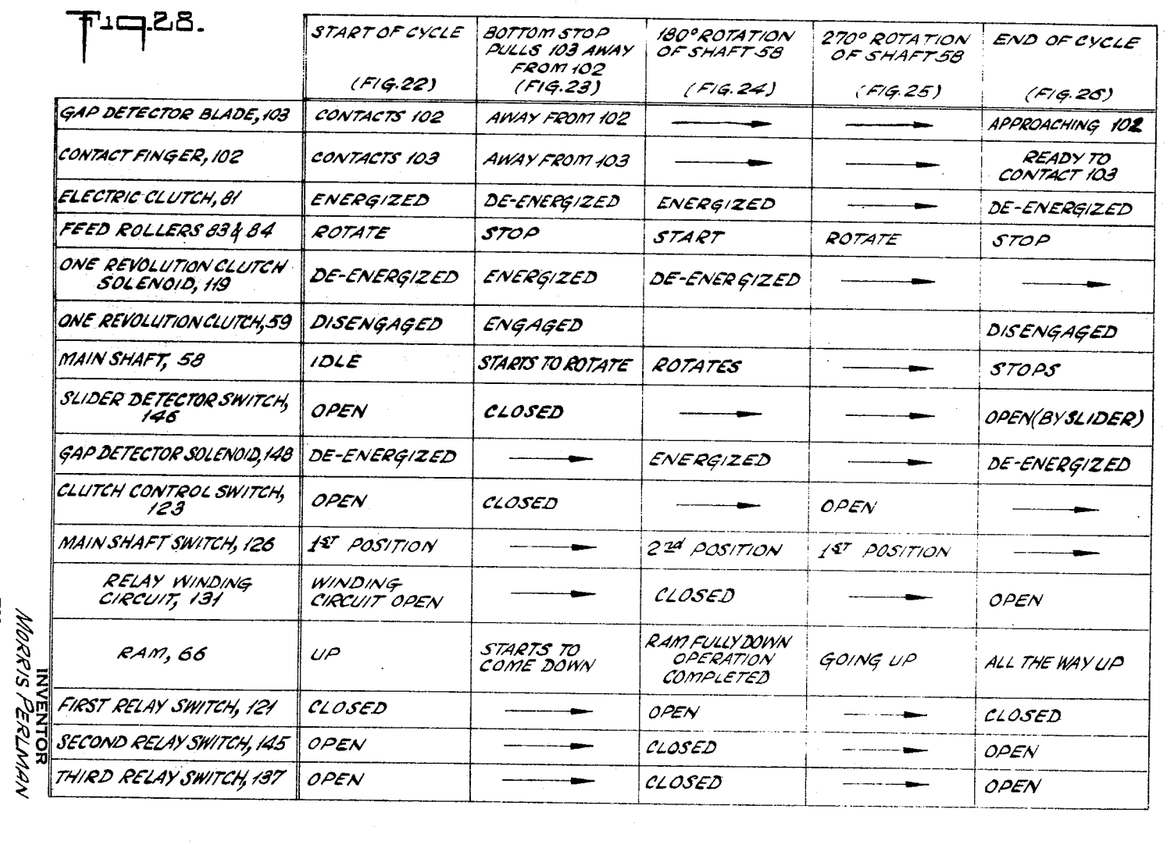
FIG. 28 is a chart showing the condition of various machine elements during different portions of the operating cycle.

FIG. 27 illustrates a safety feature which acts if the stringer gap is not properly centered. In such an event, when the gap detector blade 103 attempts to rise from the position of FIG. 26 to that of FIG. 22, it contacts the underside of one of the tapes, instead of passing between them. This situation prevents the establishment of electrical contact between the gap detector blade 103 and the contact finger 102 and stops the machine.

The position of the lower dies and the related structure may be adjusted vertically by means of clamping bolt 157, which holds die support block 39 to the frame of the machine. This bolt extends through an adjustment slot 158 in the die support block. A threaded stud 159 carried by the die support block threads into a rotatable adjustment nut 160, which rests on the machine frame and may be employed to achieve a fine adjustment of the position of the die support block.

The following is claimed:

1. A machine for operating at selected sites along the length of two flexible tapes, said tapes being joined along their opposed inner edges to form joined segments, and said tapes being separated by gaps along unjoined segments alternating along the length of the tapes with the joined segments, said machine comprising:
   (a) operating means for operating on a tape at a work station when said operating means is activated;
   (b) advancing means for advancing the tapes lengthwise past the work station when said advancing means is activated;
   (c) detection means for detecting the approach of the leading end of a joined segment to the work station;
(d) de-activating means for de-activating the advancing means and thereby arresting the motion of the tapes when the detection means detects the approach of a leading end of a joined segment;
(e) activation means for activating the operating means when the detecting means detects the approach of a leading end of a joined segment and thereby performing an operation on the tape at the work station; and
(f) re-activation means operable after the activation of the operating means for re-activating the advancing means.

2. The machine of claim 1 wherein the detection means comprises a detection element movable through a gap between the tapes.

3. The machine of claim 2 comprising a lower spreader tongue movable into a position between the tapes adjacent the work station for separating the opposed edges of the tapes at the work station and locating said edges preparatory to operation on the tape by the operating means.

4. The machine of claim 2 wherein the detection element when in position within the gap between the tapes is movable in the direction of advance of the tapes, said movement serving to activate the operating means.

5. A machine for applying top stops to joined uncut stringers, said machine having applying means adapted when activated to apply a top stop at a work station, said machine comprising:
(a) guide surfaces for guiding the joined uncut stringers from a storage area through the work station;
(b) feed means operable when activated to move joined uncut stringers through the work station from a storage area;
(c) a gap detector (103) movable from a first to a second position, from the second position to a third position, and from the third position back to the first position;
  (i) said first position being between the storage area and the work station and the gap detector when in the first position being adapted to extend through a stringer gap,
  (ii) said second position lying between the first position and the work station and the gap detector when in the second position being adapted to extend through a stringer gap,
  (iii) said third position being clear of the path of joined uncut stringers through the machine, and
  (iv) the gap detector being movable from the first to the second position by contact with an advancing bottom stop of a joined uncut stringer;
(d) a gap detector switch (91) closed when the gap detector is in the first position and open when the gap detector is in the second and third positions;
(e) a control switch (123) closed when the gap detector is in the second position and open when the gap detector is in the first or third positions;
(f) a first relay switch (121) movable between an open and a closed position;
(g) a second relay switch (145) movable between an open and a closed position;
(h) a third relay switch (137) movable between an open and a closed position;
(i) a slider detector switch (146) movable between an open and a closed position;
(j) means for activating the feed means when the gap detector switch is closed;
(k) means for activating the applying means when both the control switch and the first relay switch are in their closed positions;
(l) a fourth switch (126) movable from an open to a closed position when the applying means has reached a pre-selected position after its activation;
(m) means for moving the first relay switch into the open position and the second and third relay switches into the closed position when the fourth switch is moved into the closed position;
(n) means for holding the first relay switch in the open position and the second and third relay switches in the closed position when both the second relay switch and the slider detector switch are in the closed position;
(o) means for activating the feed means when the third relay switch is in the closed position;
(p) means (154) for detecting the presence of a slider at a predetermined position after said slider has been fed past the work station and for moving the slider detector switch to the open position when a slider is so detected;
(q) means (148) for moving the gap detector from the second to the third position when both the second relay switch (145) and the slider detector switch (146) are in their closed positions;
(r) means (110, 114) biasing the gap detector toward the first position;
(s) means biasing the first relay switch toward the closed position and the second and third relay switches toward the open position.

6. The machine of claim 5 comprising means for automatically halting the operation of the machine if the applying means fails to apply a top stop during a cycle of the machine.

7. In a machine for automatically applying top stops to slide fastener stringers, wherein during a machine cycle an electrically conductive top stop is attached to a portion of a stringer between an upper and a lower die, a device for insuring proper operation of the machine comprising means for creating an electrical potential between the upper and lower dies during a chosen moment in the attachment operation, means for detecting the flow of electric current between the dies through a top stop during the chosen moment, and means for modifying the normal operation of the machine in the absence of such electric current when a top stop is not properly applied.

8. The machine of claim 7 wherein the indicating means comprises means for stopping the machine in the absence of the electric current.

9. A machine for applying top stops to joined uncut stringers, said machine having applying means operable when activated to apply a top stop at a work station, said machine comprising:
(a) feed means for feeding the joined uncut stringers through the work station when said feed means are in an activated condition and for halting the joined uncut stringers when in a deactivated condition;
(b) bottom stop detecting means for detecting the presence of a bottom stop at a predetermined position relative to the work station and for placing the feed means in a deactivated condition when a bottom stop is so detected;
(c) means for automatically activating the applying means when a bottom stop is detected by the bottom stop detecting means at a predetermined position relative to the work station;
(d) means for placing the feed means in the activated condition following the operation of the applying device.

10. The means of claim 9 comprising:
(e) means for sensing the absence of a top stop on the joined uncut stringers at a predetermined instant during the operation of the applying means and for halting the normal operation of the machine when such absence is detected.

11. A machine for attaching top stops to joined uncut stringers, said machine comprising:
(a) surfaces defining a central channel, with an entrance end and an exit end;
(b) feed means for pulling, while said feed means is activated, joined uncut stringers lengthwise from the entrance end to the exit end through the central channel with bottom stops thereon leading;

(c) a top stop fastener mechanism movable, when activated, through an attachment cycle to attach top stops to the separable fastener tapes at a work station on the central channel;

(d) slider detector means adjacent the central channel for detecting the presence of a slider after said slider has passed the work station;

(e) a gap detector blade having a contact portion movable transversely of the central channel from a third position out of the path of bottom stops advancing along said central channel to a first position within the path of such bottom stops at a point between the entrance end of the central channel and the work station, said contact portion being movable from the first position toward the work station to a second position under the urging of bottom stops moving in the central channel;

(f) means for activating the feed means while the gap detector blade is in the first position;

(g) means for activating the top stop fastener mechanism when the gap detector blade is in the second position;

(h) means for activating the feed means when the top stop fastener mechanism has attached a top stop to the joined uncut stringer and for maintaining the feed means in an activated condition until the slider detector means detects a slider;

(i) means for moving the gap detector blade from the second to the third position when the top stop fastener mechanism has attached a top stop to the joined uncut stringer; and (j) means for moving the gap detector blade from the third to the first position when the slider detector means detects the presence of a slider.

12. A device for controlling the operation of an attachment machine for top stops, said machine being adapted when activated to execute an attachment cycle during which the machines attaches a top stop to a selected portion of the joined uncut stringers at a work station, said device comprising:

(a) guide surfaces defining a central channel leading from a storage area to the work station and adapted for the guidance of joined uncut stringers;

(b) feed rolls (83, 84) alined with the central channel and adapted, when rotated, to pull uncut joined stringers through said central channel from the storage area past the work station;

(c) a continuously operable feed motor (77);

(d) an electric clutch (81) engageable during the receipt of an electric clutch current to connect the feed motor in driving relation to the feed rollers;

(e) a gap detector blade movable between a first position, a second position, and a third position,
   (i) the gap detector blade when in the first and second positions extending into the central channel at predetermined points therein in the path of bottom stops advancing along the central channel;
   (ii) the gap detector blade being movable from the first position to the second position under the urging of a bottom stop advancing along the central channel,
   (iii) the gap detector blade when in the third position being clear of the path of a bottom stop advancing in the central channel, (f) gap detector blade positioning means (110, 114) urging the gap detector blade toward the first position;

(g) a gap detector solenoid (148) connected to the gap detector blade and adapted, while energized by a gap detector solenoid current, to move the gap detector blade from the second to the third position and to hold said blade in the third position;

(h) a slider detector head (154) between the work station and the feed rolls in the path of sliders advancing from the work station to the feed rolls, said slider detector head being movable from a first to a second position under the urging of said sliders when said sliders reach a predetermined position;

(i) a slider detector switch associated with the slider detector head, said slider detector switch being closed when the slider detector head is in the first position and open when the slider detector head is in the second position;

(j) a gap detector switch (91) movable to a closed position in response to motion of the gap detector blade into the first position and movable into an open position in response to motion of the gap detector blade from the first position;

(k) a first feed control circuit in series with the gap detector switch for furnishing an electric clutch current to the electric clutch;

(l) a clutch control switch (123) movable to a closed position in response to motion of the gap detector blade into the second position and into an open position in response to motion of the gap detector blade from the second position;

(m) a relay (132), said relay having
   (i) a first relay switch (121) normally in a closed position,
   (ii) a second relay switch (148) normally in an open position,
   (iii) a third relay switch (137) normally in an open position, and
   (iv) a relay winding adapted, while energized by a relay current, to hold the first relay switch in an open position and the second and third relay switches in a closed condition;

(n) first means (119) to activate the top stop attachment machine in response to a signal current;

(o) a signal circuit for supplying the signal current, said signal circuit being in series with the first relay switch and the clutch control switch;

(p) an attachment machine switch (126) connected to the top stop attachment machine and having an attachment machine switch second circuit (134, 140) which is normally in an open position;

(q) means (129) for closing the attachment machine switch second circuit momentarily during that portion of the attachment cycle when a top stop has just been attached;

(r) a first relay circuit (133) in series with the attachment machine switch second circuit for supplying relay current to the relay winding;

(s) a second relay circuit in series with the second relay switch (145) and the slider detector switch (146) for supplying relay current to the relay winding;

(t) a second feed control circuit (136) in series with the third relay switch (137) for furnishing an electric clutch current to the electric clutch; and (u) a gap detector solenoid circuit in series with the second relay switch and the slider detector switch for furnishing a gap detector solenoid current.

13. The device of claim 12 comprising:

(v) an attachment machine switch first circuit (139, 140) in the attachment machine switch which is normally in a closed position;

(w) means (129) for opening the attachment machine switch first circuit while the attachment machine switch second circuit is closed;

(x) a pair of contact elements in the attachment device, said elements being electrically insulated from each other and being adapted to contact an attached top stop during the period when the attachment machine switch first circuit is open;

(y) a safety switch (141) in series with the first feed control circuit, said safety switch being normally in an open position;

(z) safety switch holding means (138) for holding the safety switch in a closed position in response to a safety switch current;

(aa) a first safety switch circuit in series with the attachment machine switch first circuit for furnishing a safety switch current to the safety switch holding means;

(ab) a second safety switch circuit (143) for furnishing a safety switch current to the safety switch holding means, said second safety switch circuit comprising in series the gap between the contact elements, whereby said circuit may be completed by an electrically conductive top stop extending between the contact elements.

References Cited

UNITED STATES PATENTS 2,631,638 3/1953 Levine.
2,766,452 10/1956 Hansen.

THOMAS H. EAGER, Primary Examiner

U.S. Cl. X.R.

29—208